United States Patent [19]

Youn et al.

[11] Patent Number: 5,701,243

[45] Date of Patent: Dec. 23, 1997

[54] HIGH-POWER FACTOR SERIES RESONANT RECTIFIER CIRCUIT

[75] Inventors: Myung Joong Youn; Gun Woo Moon, both of Daejeon; Marn Go Kim, Seoul, all of Rep. of Korea

[73] Assignee: Korea Telecommunication Authority, Seoul, Rep. of Korea

[21] Appl. No.: 571,085

[22] Filed: Dec. 12, 1995

[30] Foreign Application Priority Data

Dec. 12, 1994 [KR] Rep. of Korea ............... 94-33797

[51] Int. Cl.$^6$ .................... H02M 7/04; H02M 7/538
[52] U.S. Cl. .................... 363/89; 363/134
[58] Field of Search .................... 363/16, 22–25, 363/86, 89, 97, 124–127, 131, 133, 134, 34, 37

[56] References Cited

U.S. PATENT DOCUMENTS 4,959,766  9/1990  Jain ........................... 363/48
5,475,580  12/1995  Noro .......................... 363/24
5,510,974  4/1996  Gu et al. ...................... 363/134

*Primary Examiner*—Matthew V. Nguyen
*Attorney, Agent, or Firm*—Merchant, Gould, Smith, Edell, Welter & Schmidt, P.A.

[57] ABSTRACT

A high-power factor series resonant rectifier circuit comprising a first rectifier for rectifying an AC input power, a push-pull switching circuit for changing a polarity in the output of the first rectifier in response to a resonant frequency, an isolation transformer for transforming the output of the push-pull switching circuit, an LC resonance tank for resonating the output of the isolation transformer, a second rectifier for rectifying the output of the LC resonant tank, and a boost chopper switch connected in parallel to the output of the second rectifier. The boost chopper switch performs a switching operation when a resonant current becomes zero, resulting in an increase in power density. The increase in power density results in a reduction in switching loss. Therefore, the rectifier circuit of the present invention is operable at a high frequency.

8 Claims, 5 Drawing Sheets

HIGH-POWER FACTOR SERIES RESONANT RECTIFIER CIRCUIT

BACKGROUND OF THE INVENTION

1. Field of the Invention

The present invention relates in general to rectifier circuits used in power conversion devices, and more particularly to a high-power factor series resonant rectifier circuit having a low electromagnetic interference (EMI), a high power density and a low line current distortion in conformity with an optical communication age.

2. Description of the Prior Art

Generally, a rectifier circuit is used to obtain a direct current (referred to hereinafter as DC) power in power conversion devices such as a communication power supply, a computer power supply, etc. The rectifier circuit acts to rectify a commercial alternating current (referred to hereinafter as AC) power to convert it into DC power. Such a conventional rectifier circuit will hereinafter be described with reference to FIGS. 1A and 1B.

FIG. 1A is a circuit diagram of a conventional peak rectifier circuit employing a diode bridge, which has widely been used, and FIG. 1B is a waveform diagram of signals in FIG. 1A. As shown in FIG. 1A, the conventional peak rectifier circuit comprises a rectifier 1 including a diode bridge for rectifying an input AC power of 115 Vrms, 60 Hz and 450 W. In FIG. 1B, the reference characters $i_1(t)$ and $v(t)$ indicate waveforms (solid lines) of input current and voltage to the rectifier 1, respectively.

In the above-mentioned conventional peak rectifier circuit, the input current $i_1(t)$ has large distortion because it is transferred only when the capacitor voltage is below that of the input voltage, as shown in FIG. 1B. Such a large distortion of the input current $i_1(t)$ results in a severe EMI problems on communication equipment and peripheral circuits. The dotted line in FIG. 1B indicates a waveform of a desired input current for obtaining a unit power factor. The desired input current has a sinusoidal waveform in phase with the input voltage $v(t)$, but generates a low power factor and a surge current, resulting in a reduction in the power supply capability of an AC power source. To overcome the above problems, many studies of rectifier circuits, more particularly pulse width modulation boost converters, have recently been made. Such conventional pulse width modulation boost converters will hereinafter be mentioned with reference to FIGS. 2A and 2B.

FIG. 2A is a circuit diagram of a conventional pulse width modulation (referred to hereinafter as PWM) boost converter and FIG. 2B is a waveform diagram of signals in FIG. 2A. As shown in FIG. 2A, the conventional PWM boost converter comprises a rectifier 2 including a diode bridge for rectifying an input AC power, and a boost chopper switch 3 connected in parallel with the output of the rectifier 2. In FIG. 2B, the reference characters $I_2$ and $V_{AB}$ indicate waveforms of current and voltage across the boost chopper switch 3, respectively.

In the above-mentioned conventional PWM boost converter, the boost chopper switch 3 suffers a loss during its switching operation, resulting from distortions of the voltage $V_{AB}$ and current $I_2$, more particularly of the current $I_2$, as shown in FIG. 2B. Such a loss in the boost chopper switch 3 results in switching frequency limitations, high electromagnetic noise and high device stress.

SUMMARY OF THE INVENTION

Therefore, the present invention has been made in view of the above problems, and it is an object of the present invention to provide a high-power factor series resonant rectifier circuit in which power density is increased by using a resonant manner in which a switching device performs a switching operation when current flowing therethrough becomes zero, thereby reducing switching loss, so that the rectifier circuit can operate at a high frequency.

In accordance with the present invention, the above and other objects can be accomplished by a provision of a high-power factor series resonant rectifier circuit comprising: a first rectifying means for rectifying an AC input power; a polarity changing means for changing a polarity in the output of the first rectifying means in response to a resonant frequency; an isolation transforming means for transforming the output of the polarity changing means; and a resonant means for resonating the output of the isolation transforming means.

The high-power factor series resonant rectifier circuit further comprises a second rectifying means for rectifying the output of the resonant means; and a boost chopper switching means connected in parallel to the output of the second rectifying means.

BRIEF DESCRIPTION OF THE FIGURE

The above and other objects, features and advantages of the present invention will be more clearly understood from the following detailed description taken in conjunction with the accompanying Figure, in which.

DETAILED DESCRIPTION OF THE PREFERRED EMBODIMENTS

Figure 1A:
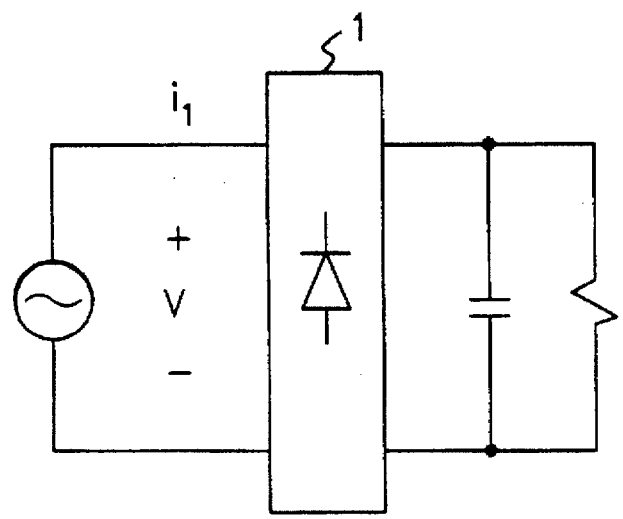
FIG. 1A is a circuit diagram of a conventional peak rectifier circuit.
Figure 1B:
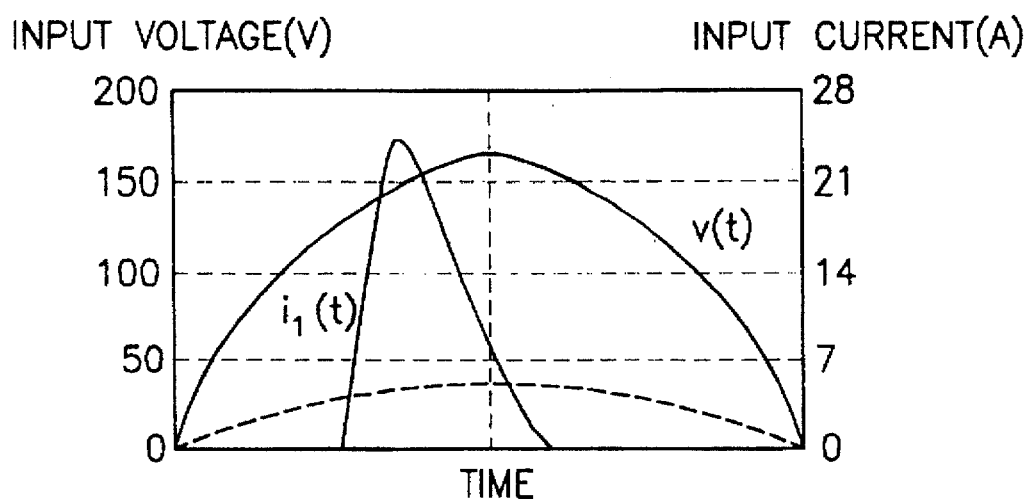
FIG. 1B is a waveform diagram of signals in FIG. 1A.
Figure 2A:
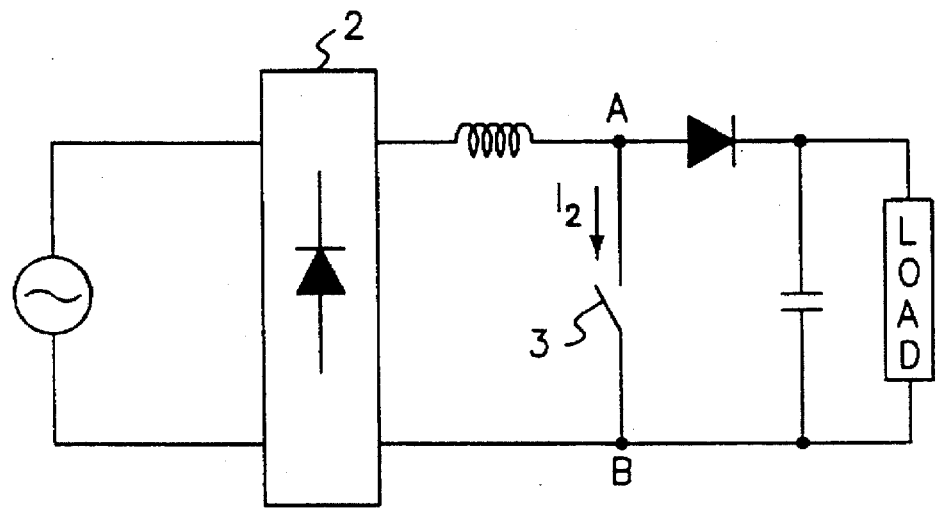
FIG. 2A is a circuit diagram of a conventional PWM boost converter.
Figure 2B:
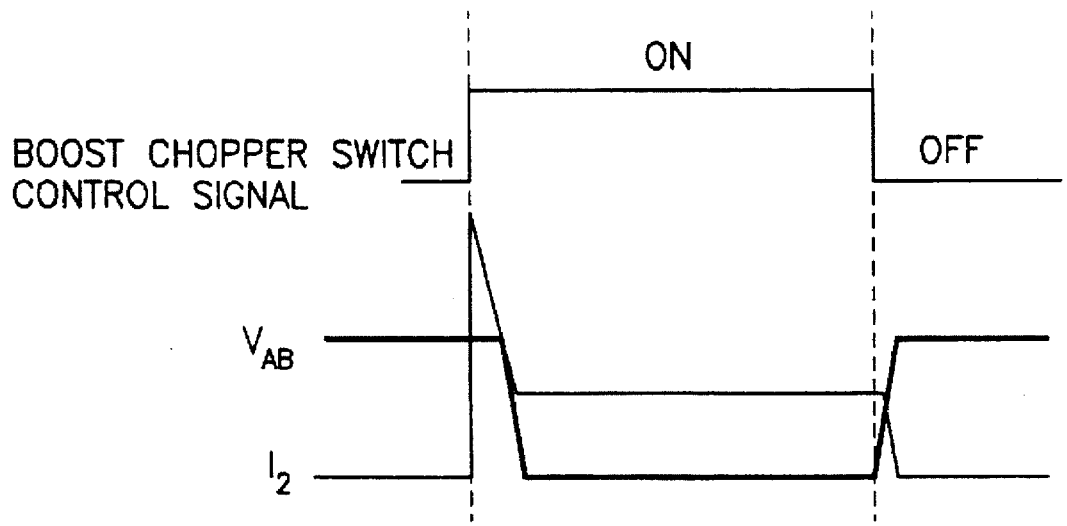
FIG. 2B is a waveform diagram of signals in FIG. 2A.
Figure 3:
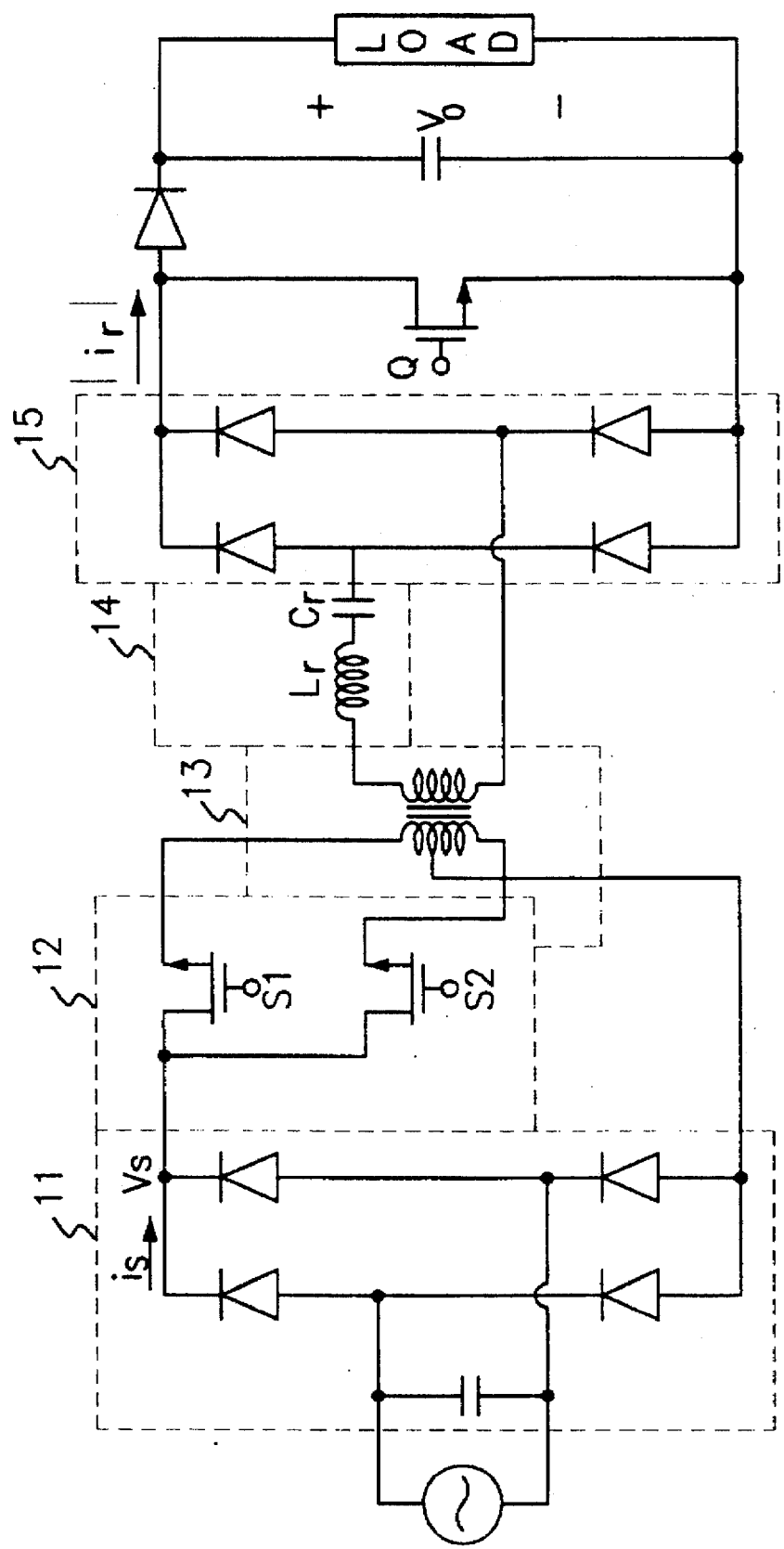
FIG. 3 is a circuit diagram of a high-power factor series resonant rectifier circuit in accordance with an embodiment of the present invention.

Referring to FIG. 3, there is shown a circuit diagram of a high-power factor series resonant rectifier circuit in accordance with an embodiment of the present invention. As shown in this Figure, the high-power factor series resonant rectifier circuit comprises a rectifier 11 for rectifying an AC input power, a push-pull switching circuit 12 for making a resonant switching frequency modulated voltage in response to control signals based on a resonant frequency, an isolation transformer 13 for transforming the output of the push-pull switching circuit 12, an LC resonant tank 14 for making the high frequency resonant current, a rectifier 15 for rectifying the output of the LC resonant tank 14, and a boost chopper switch Q connected in parallel with the output of the rectifier 15, for performing a switching operation in response to a control signal.

The isolation transformer 13 has an intermediate tap at its primary coil, which is connected to one side of the output of the rectifier 11. The primary coil of the isolation transformer 13 has both of its sides connected to the other side of the output of the rectifier 11 respectively through push-pull switches S1 and S2 in the push-pull switching circuit 12. The LC resonant tank 14 includes a inductor Lr and a capacitor Cr connected in series to one side of a secondary winding of the isolation transformer 13, the other side of which is connected to the rectifier 15. The rectifiers 11 and 15 include diode bridges, respectively. The control signal to the boost chopper switch Q is generated whenever the resonant current becomes zero.

The operation of the high-power factor series resonant rectifier circuit with the above-mentioned construction in accordance with the embodiment of the present invention will hereinafter be described in detail with reference to FIGS. 3 to 6.

The isolation transformer 13 with the intermediate tap at its primary winding is used for an electrical isolation and has a turn ratio such that an output voltage therefrom can have a peak value lower than that of an input voltage thereto. Generally, an active rectifier circuit outputs a voltage with a peak value higher than that of an input voltage. This is a common feature of the boost-type rectifier. For this reason, a step-down DC/DC converter must additionally be used to obtain a voltage of 48 VDC in a distributed power system. Namely, two power stages are required in the distributed power system. However, the rectifier circuit of the present invention can output a voltage with a peak value lower than that of an input voltage thereto by means of the isolation transformer 13 without using an additional power stage.

Whenever the resonant current becomes zero, the push-pull switches S1 and S2 are turned on/off so that a rectified current from the rectifier 11 can always flow to the LC resonant tank 14 in the same direction as the resonant current. As a result, the LC resonant tank 14 is continuously supplied with energy from the input voltage. Namely, the push-pull switches S1 and S2 act to transfer the input voltage, modulated at the resonant frequency, to the LC resonant tank 14. Therefore, according to the present invention, the rectifier circuit is capable of obtaining a consecutive input current, as in conventional PWM boost converters of the hard switching type, and, furthermore, all boost-type characteristics.

Figure 4:
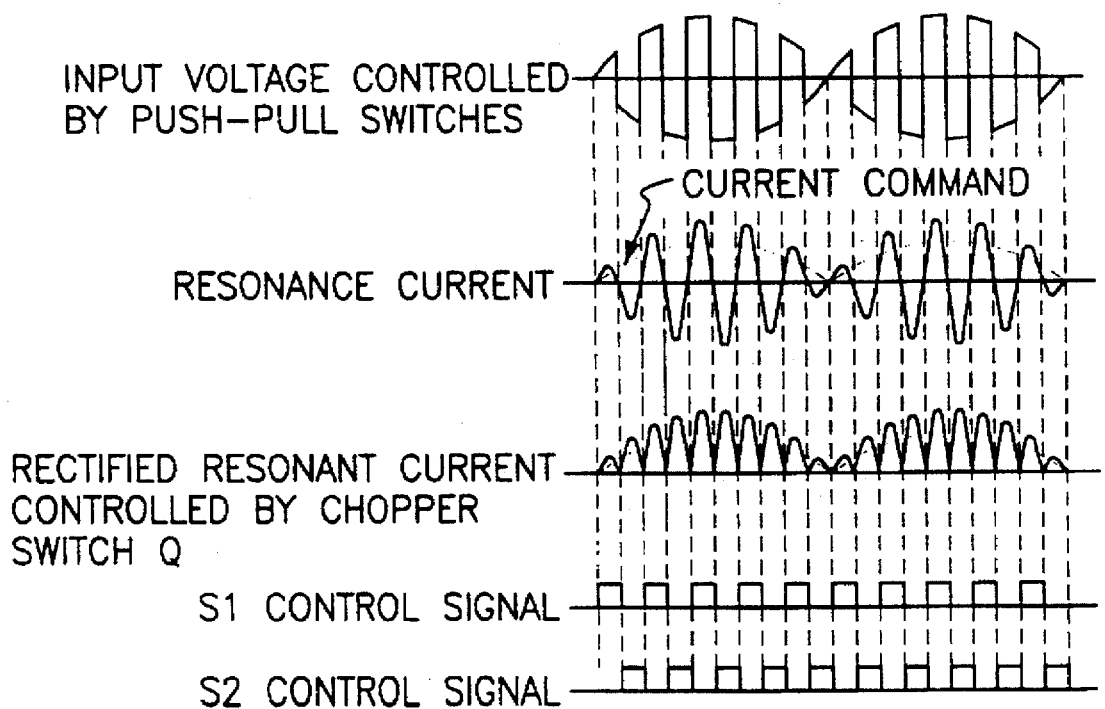
FIGS. 4 to 6 are waveform diagrams of signals in FIG. 3.

FIG. 4 shows waveforms of the input voltage and resonant current controlled by the push-pull switches S1 and S2 and the control signals applied to the push-pull switches S1 and S2. As shown in this Figure, the push-pull switch S1 is turned on for the first half of a resonant period and the push-pull switch S2 is turned on for the latter half of the resonant period. Such high-frequency switching operations of the push-pull switches S1 and S2 allow the use of an isolation transformer 13 of reduced size. A unit power factor can be obtained by controlling the switching operation of the boost chopper switch Q with the switching operations of the push-pull switches S1 and S2. In a similar manner to the push-pull switches S1 and S2, the boost chopper switch Q performs its switching operation when the resonant current becomes zero. In the case where the boost chopper switch Q is turned on under the condition that the push-pull switches S1 and S2 are alternately turned on/off, the resonant current is increased to its maximum value. Then, when the boost chopper switch Q is turned off, the resonant current is reduced because the output voltage is connected in series to the LC resonant tank 14. Generally, a boost-type converter provides an output voltage higher than an input voltage. Thus, resonant current is reduced when the boost chopper switch Q is turned off, since a rectified input voltage is applied to the LC resonant tank 14 simultaneously with the output voltage.

In FIG. 4, a current command is obtained by sensing the input voltage. The on/off control signals to the push-pull switches S1 and S2 and boost chopper switch Q are supplied from an external controller (not shown) so that the switches can operate in the above manner.

Figure 5:
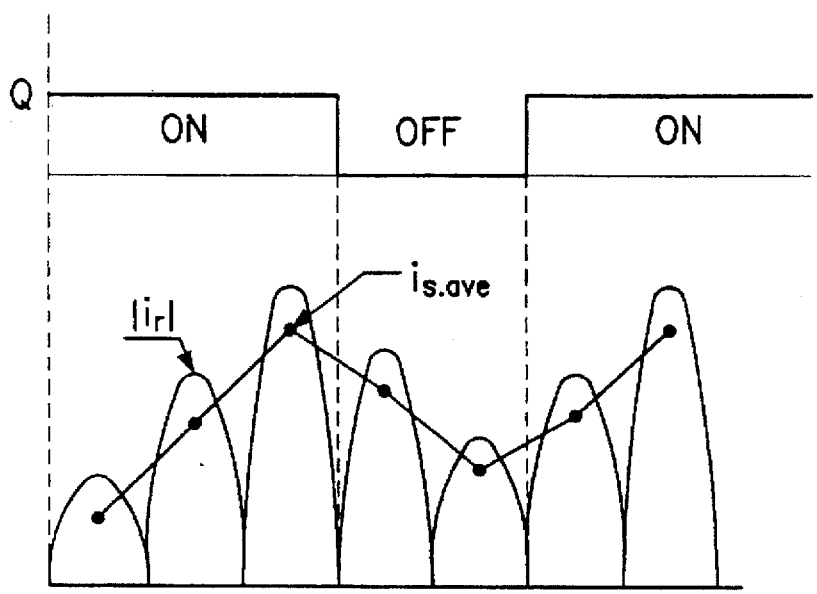

FIG. 5 shows a current waveform based on the switching operation of the boost chopper switch Q. As shown in this Figure, input current values $i_r$ and $i_{s,ave}$ can be controlled by controlling only the boost chopper switch Q. The input current is compared with the current command and the boost chopper switch Q is controlled in accordance with the compared result. In this manner, the input current can be in phase with the input voltage and have a small distortion, thereby obtaining a high power factor of 0.95 or more.

Figure 6:
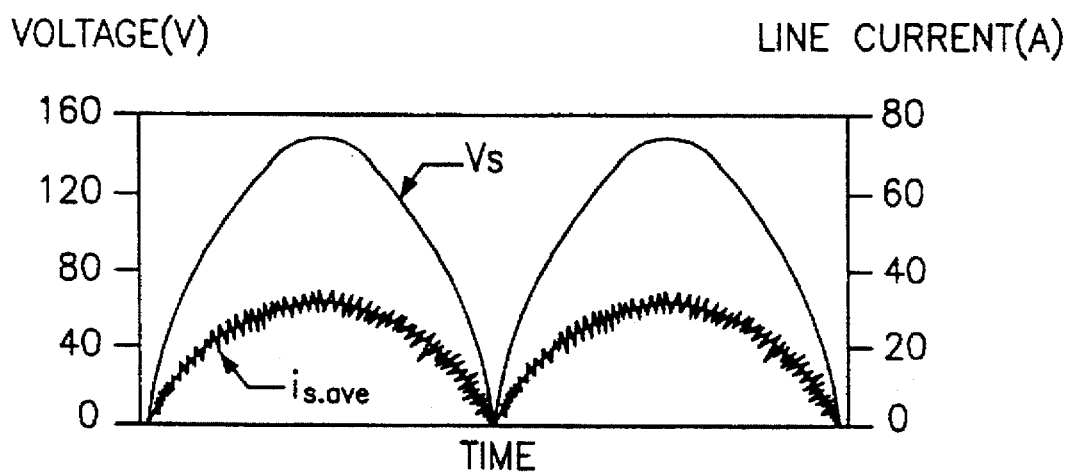

FIG. 6 shows a rectified input voltage Vs and the average $i_{s,ave}$ of a rectified input current. As seen from this Figure, the rectifier circuit of the present invention has the effect of obtaining a high power factor in a communication power supply, a computer power supply, etc.

As is apparent from the above description, the present invention increases power density by using the resonant manner in which the switching device performs its switching operation when the resonant current becomes zero. The increase in power density results in a reduction in switching loss. Therefore, the rectifier circuit of the present invention is operable at a high frequency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high-power factor series resonant rectifier circuit comprising:

a first rectifying means for rectifying an AC input signal to produce a first rectified output;

a polarity changing means for changing polarity of the first rectified output in response to a resonant frequency to produce an alternating output;

an isolation transforming means for transforming the alternating output to produce a transformer output; and a resonant means for resonating the transformer output to produce a resonated output, the resonant frequency being associated with the resonant means.

2. A high-power factor series resonant rectifier circuit as set forth in claim 1, further comprising:

second rectifying means for rectifying the resonated output and to produce a second rectified output; and boost chopper switching means connected in parallel with the second rectified output.

3. A high-power factor series resonant rectifier circuit as set forth in claim 2, wherein said boost chopper switching means is turned on/off whenever a resonant current becomes zero in response to the resonant frequency.

4. A high-power factor series resonant rectifier circuit as set forth in claim 1, wherein said polarity changing means includes a pair of push-pull switches for alternately switching polarity of the first rectified output applied to said isolation transforming means.

5. A high-power factor series resonant rectifier circuit as set forth in claim 1, wherein said resonant means includes a coil and a capacitor connected in series to the transformer output.

6. A high-power factor series resonant rectifier circuit as set forth in claim 4, wherein said polarity changing means is adapted to change the polarity of the first rectified output whenever a resonant current of said resonant means becomes zero in response to the resonant frequency.

7. A high-power factor series resonant rectifier circuit comprising:

a first rectifying means for rectifying an AC input signal to produce a first rectified output;

a polarity changing means for changing polarity of the first rectified output in response to a resonant frequency to produce an alternating output;

an isolation transforming means for transforming the alternating output to produce a transformer output; and a series resonant means for resonating the transformer output to produce a resonated output in series with the series resonant means, the resonant frequency being associated with the resonant means.

8. A high-power factor series resonant rectifier circuit comprising:

a first rectifying means for rectifying an AC input signal to produce a first rectified output;

a polarity changing means for changing polarity of the first rectified output in response to a resonant frequency to produce an alternating output;

an isolation transforming means for transforming the alternating output to produce a transformer output;

a resonant means for resonating the transformer output to produce a resonated output, the resonant frequency being associated with the resonant means; and a second rectifying means for rectifying the resonated output and to produce a second rectified output.

* * * * *